(12) United States Patent
Lee et al.

(10) Patent No.: US 9,650,548 B2
(45) Date of Patent: May 16, 2017

(54) POLYOLEFIN-BASED COMPOSITIONS, ADHESIVES, AND RELATED MULTI-LAYERED STRUCTURES PREPARED THEREFROM

(71) Applicant: Equistar Chemicals, LP, Houston, TX (US)

(72) Inventors: Chun D. Lee, Cincinnati, OH (US); Maged G. Botros, Liberty Township, OH (US); William R. Podborny, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 41 days.

(21) Appl. No.: 14/744,970

(22) Filed: Jun. 19, 2015

(65) Prior Publication Data
US 2016/0040044 A1 Feb. 11, 2016

Related U.S. Application Data

(60) Provisional application No. 62/033,944, filed on Aug. 6, 2014.

(51) Int. Cl.
| | |
|---|---|
| C09J 123/06 | (2006.01) |
| B32B 27/08 | (2006.01) |
| B32B 27/32 | (2006.01) |
| B32B 27/36 | (2006.01) |
| B32B 7/12 | (2006.01) |
| B32B 27/18 | (2006.01) |
| B32B 27/30 | (2006.01) |
| B32B 27/34 | (2006.01) |
| C09J 123/08 | (2006.01) |

(52) U.S. Cl.
CPC .............. *C09J 123/06* (2013.01); *B32B 7/12* (2013.01); *B32B 27/08* (2013.01); *B32B 27/18* (2013.01); *B32B 27/306* (2013.01); *B32B 27/32* (2013.01); *B32B 27/327* (2013.01); *B32B 27/34* (2013.01); *B32B 27/36* (2013.01); *C09J 123/0815* (2013.01); *B32B 2250/24* (2013.01); *B32B 2307/72* (2013.01); *B32B 2405/00* (2013.01); *B32B 2419/00* (2013.01); *B32B 2439/00* (2013.01); *B32B 2439/70* (2013.01)

(58) Field of Classification Search
CPC .......................... C09J 123/06; C09J 123/0815
See application file for complete search history.

(56) References Cited

U.S. PATENT DOCUMENTS

| | | | |
|---|---|---|---|
| 4,460,745 A | 7/1984 | Adur et al. | |
| 6,210,765 B1 * | 4/2001 | Tanaka | C09J 123/0815 428/34.9 |
| 7,687,575 B2 * | 3/2010 | Lee | B32B 27/32 428/461 |
| 7,794,806 B2 * | 9/2010 | Pradel | C08L 23/0815 428/34.1 |
| 7,932,323 B1 * | 4/2011 | Botros | B32B 27/08 525/221 |
| 8,197,947 B2 * | 6/2012 | Botros | B32B 7/12 428/523 |
| 2009/0035594 A1 * | 2/2009 | Lee | B32B 7/12 428/476.9 |
| 2009/0171022 A1 * | 7/2009 | Botros | C09J 123/0815 525/57 |
| 2011/0223439 A1 * | 9/2011 | Botros | B32B 7/12 428/517 |
| 2013/0052471 A1 * | 2/2013 | Botros | B32B 27/32 428/476.9 |
| 2013/0085221 A1 * | 4/2013 | Botros | C09J 151/06 524/504 |
| 2014/0322542 A1 * | 10/2014 | Botros | B32B 27/08 428/422 |
| 2015/0267087 A1 * | 9/2015 | Botros | C08L 23/10 524/151 |
| 2016/0040044 A1 * | 2/2016 | Lee | B32B 27/08 428/355 EN |

FOREIGN PATENT DOCUMENTS

| | | |
|---|---|---|
| WO | WO-2006019922 A1 | 2/2006 |
| WO | WO-2013032926 A1 | 3/2013 |

OTHER PUBLICATIONS

International Search Report and Written Opinion Mailed Sep. 30, 2015 (Sep. 30, 2015) for Corresponding PCT/US2015/043642.

* cited by examiner

*Primary Examiner* — Michael A Salvitti

(57) ABSTRACT

The present disclosure provides a polyolefin-based composition made from or containing (A) a first grafted polyolefin composition, (B) a second grafted polyolefin composition made from or containing a first metallocene-catalyzed linear low density polyethylene grafted with an unsaturated monomer, (C) a second metallocene-catalyzed linear low density polyethylene composition, (D) a Ziegler-Natta-catalyzed linear low density polyethylene composition, (E) an elastomeric composition made from or containing (i) an elastomeric ethylene copolymer and (ii) an ethylene-propylene elastomer, and (F) a tackifier composition. Optionally, the polyolefin-based composition may be further made from or contain an additives composition. The polymeric composition is suitable for use as a tie-layer adhesive composition.

16 Claims, No Drawings

POLYOLEFIN-BASED COMPOSITIONS, ADHESIVES, AND RELATED MULTI-LAYERED STRUCTURES PREPARED THEREFROM

CROSS-REFERENCE TO RELATED APPLICATIONS

This application is the Non-Provisional Patent Application, which claims benefit of priority under 35 U.S.C. §119(e) of U.S. Provisional Application No. 62/033,944, filed Aug. 6, 2014, the contents of which are incorporated herein by reference in their entirety.

FIELD OF THE INVENTION

In general, the present disclosure relates to the field of chemistry. More specifically, the present disclosure relates to polyolefin-based compositions useful as adhesives or tie-layer adhesive compositions for multi-layered structures. In particular, the compositions are useful as adhesives to bind a polyester-based layer to a dissimilar substrate.

BACKGROUND OF THE INVENTION

Tie-layer adhesives are used to bond polyesters to dissimilar substrates in multi-layer, co-extruded structures, beverage and food containers (e.g., bags, shrink bags, pouches, casings, trays, lidded trays, overwrapped trays, form shrink packages, vacuum skin packages, flow wrap packages, thermoformed packages, packaging inserts or combinations thereof), medicine and makeup containers, shipping packaging, electronic components, synthetic fibers, fiberfill applications (e.g., home insulation, cushions, and pillows), and metal laminate applications (e.g., building and construction products, business and consumer products, containers and packaging products, electrical equipment, machinery and industrial equipment, signs and displays, and transportation products). They can be used in lamination, extrusion (or coextrusion), sheet extrusion, extrusion coating, injection molding, blow molding, melt thermoforming, blown film, cast film, and other processes.

Improved tie-layer adhesive compositions suitable for use in making multi-layer structures with good adhesion, high clarity, melt temperatures, and printability are needed.

BRIEF SUMMARY OF THE INVENTION

In some embodiments, the present disclosure provides a polyolefin-based composition made from or containing:
(A) a first grafted polyolefin composition;
(B) a second grafted polyolefin composition made from or containing a first metallocene-catalyzed linear low density polyethylene grafted with an unsaturated monomer;
(C) a second metallocene-catalyzed linear low density polyethylene composition;
(D) a Ziegler-Natta-catalyzed linear low density polyethylene composition;
(E) an elastomeric composition made from or containing:
  (i) an elastomeric ethylene copolymer and
  (ii) an ethylene-propylene elastomer, and
(F) a tackifier composition.
Optionally, the polyolefin-based composition may be further made from or contain an additives composition. The polymeric composition is suitable for use as a tie-layer adhesive composition.

In further embodiments, the present disclosure provides an adhesive made from or containing:
(A) from about 5 to about 20 weight percent of a first grafted polyolefin composition, relative to the total weight of the polyolefin-based composition,
(B) from about 5 to about 15 weight percent of a second grafted polyolefin composition made from or containing a first metallocene-catalyzed linear low density polyethylene grafted with an unsaturated monomer, relative to the total weight of the polyolefin-based composition,
(C) from about 10 to about 30 weight percent of a second metallocene-catalyzed linear low density polyethylene composition, relative to the total weight of the polyolefin-based composition,
(D) from about 15 to about 35 weight percent of a Ziegler-Natta-catalyzed linear low density polyethylene composition, relative to the total weight of the polyolefin-based composition,
(E) an elastomeric composition made from or containing
  (i) from about 10 to about 20 weight percent of an elastomeric ethylene copolymer, relative to the total weight of the polyolefin-based composition, and
  (ii) from about 10 to about 20 weight percent of an ethylene-propylene elastomer, relative to the total weight of the polyolefin-based composition, and
(F) from about 2 to about 20 weight percent of a tackifier composition, relative to the total weight of the polyolefin-based composition.

In yet additional embodiments, the present disclosure provides a multi-layered structure made from or containing:
(A) a tie-layer adhesive and
(B) a polymer layer.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

DEFINITIONS

In the present description, the term "additives composition" refers to a composition made from or containing at least one additive.

In the present description, the terms "adhesive layer" and "tie layer" mean a layer or material placed on one or more substrates to promote the adhesion of that substrate to another layer. Preferably, adhesive layers are positioned between two layers of a multilayer structure to maintain the two layers in position relative to each other and prevent undesirable delamination.

In the present description, the term "α-olefin" or "alpha-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the terms "constrained geometry catalyst" and "CGC" have the same meaning as this term is defined and described in U.S. Pat. No. 5,272,236 and U.S. Pat. No. 5,278,272.

In the present description, the terms "constrained geometry catalyst-catalyzed polymer" and "CGC-catalyzed polymer" mean any polymer that is made in the presence of a constrained geometry catalyst.

In the present description, the term "elastomer" refers to polymer compounds having rubber-like properties and crystallinity in the range of from about 0 percent to about 20 percent. The polymer can have crystallinity in the range of from about 0 percent to about 5 percent.

In the present description, the term "elastomeric ethylene copolymer composition" refers to a composition made from or containing at least one elastomeric ethylene copolymer.

In the present description, the term "grafted polyolefin" refers to a polyolefin grafted with an unsaturated monomer. The unsaturated monomer can be an unsaturated polar monomer. The unsaturated monomer can contain one or more oxygen atoms.

In the present description, the term "grafted polyolefin composition" refers to a composition made from or containing at least one grafted polyolefin.

In the present description, the term "homopolymer" as used herein is consistent with its ordinary meaning. To the extent that a homopolymer may contain one or more monomeric units, the incorporation of any additional monomeric units has essentially no effect on the polymer's primary, secondary or tertiary structure and/or no effect on the polymer's physical or chemical properties. In other words, there is no measureable difference between a polymer comprising 100 wt. % of a first monomeric unit, and a co-polymer that includes more than one monomeric units.

In the present description, the term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the term "metallocene" means a metal-containing compound having at least one substituted or unsubstituted cyclopentadienyl group bound to the metal.

In the present description, the term "metallocene-catalyzed linear low density polyethylene composition" refers to a composition made from or containing at least one metallocene-catalyzed linear low density polyethylene.

In the present description, the term "metallocene-catalyzed polymer" means any polymer that is made in the presence of a metallocene catalyst.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, "plastic film packaging" is of particular concern and discussed throughout this description. To faciliate that discussion, various polymer acronyms are used herein; they are recited below. When referring to blends of polymers, the description may use a colon (:) to indicate that the components to the left and right of the colon are blended. When referring to a multi-layer structure, the description may use a slash "/" to indicate that components to the left and right of the slash are in different layers and the relative position of components in layers may be so indicated by use of the slash to indicate layer boundaries.

Acronyms commonly employed herein include:
EAA: Copolymer of ethylene with acrylic acid
EAO: Copolymers of ethylene with at least one alpha-olefin
EBA: Copolymer of ethylene with butyl acrylate
EEA: Copolymer of ethylene with ethyl acrylate
EMA: Copolymer of ethylene with methyl acrylate
EMAA: Copolymer of ethylene with methacrylic acid
EVA: Copolymer of ethylene with vinyl acetate
EVOH: Saponified or hydrolyzed copolymer of ethylene and vinyl acetate
PB: Polybutylene-1 (a butylene homopolymer or copolymer of a major portion of butylene-1 with one or more alpha-olefins)
PE: Polyethylene (an ethylene homopolymer or copolymer of a major portion of ethylene with one or more alpha-olefins)
PP: Polypropylene homopolymer or copolymer
PET: Polyethylene terephthalate
PETG: Glycol-modified polyethylene terephthalate
PLA: Polylactic acid
PVDC: Polyvinylidene chloride (also includes copolymers of vinylidene chloride, especially with vinyl chloride or methyl acrylate (MA)).

In the present description, the term "polyester" means an homopolymer or a copolymer having an ester linkage between monomer units. In general, polyesters are synthetic polymers prepared by the polycondensation of one or more difunctional carboxylic acids with one or more difunctional hydroxyl compounds. Typically, the difunctional carboxylic acid is a dicarboxylic acid or a hydroxycarboxylic acid, and the difunctional hydroxyl compound is a dihydric alcohol such as, for example, glycols and diols. The ester can be represented by the general formula:

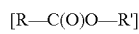

where R and R'=alkyl group.

The dicarboxylic acid may be linear or aliphatic, i.e., oxalic acid, maleic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of aliphatic polyesters include, but are not limited to, polylactic acid (PLA) homopolymer and copolymers, and those described in U.S. Pat. No. 7,422,782, which is incorporated herein by reference in its entirety. Exemplary of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthopbthalic acid, the various isomers of dimethylnaphthalic acid, such as 2,6-dimethylnaphthalic acid and 2,5-dimethylnaphthalic acid, and the various isomers of diethylnaphthalic acid.

The difunctional hydroxyl compound may be straight-chained or branched. Specific examples include ethylene glycol, propylene glycol, trimethylene glycol, 1,4-butane diol, neopentyl glycol, an aromatic diol (such as, for example, hydroquinone), and the like.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term "polyolefin" is used herein broadly to include polymers such as polyethylene, ethylene-alpha olefin copolymers (EAO), polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description, the term "room temperature" refers to a temperature around 25 degrees Celsius.

In the present description, the term "thermoplastic polymer" means a polymer that softens when exposed to heat and returns to its original condition when cooled to room temperature.

In the present description, the term "Ziegler-Natta-catalyzed linear low density polyethylene composition" refers to a composition made from or containing at least one Ziegler-Natta-catalyzed linear low density polyethylene.

In the present description, the terms "Ziegler-Natta-catalyzed polymer" and "Z-N-catalyzed polymer" mean any polymer that is made in the presence of a Ziegler-Natta catalyst.

Testing

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

ASTM D1746 is entitled "Standard Test Method for Transparency of Plastic Sheeting." The term "ASTM D 1746" as used herein refers to the standard test method for determining transparency of plastic sheeting. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10 to 90% as measured by this test. Results obtained by the use of this test method are greatly influenced by the design parameters of the instruments; for example, the resolution is largely determined by the angular width of the receptor aperture. Caution should therefore be exercised in comparing results obtained from different instruments, especially for samples with low regular transmittance. Regular transmittance data in accordance with this test method correlate with the property commonly known as "see-through," which is rated subjectively by the effect of a hand-held specimen on an observer's ability to distinguish clearly a relatively distant target. This correlation is poor for highly diffusing materials because of interference of scattered light in the visual test. This test method was approved on Feb. 1, 2009 and published March 2009, the contents of which are incorporated herein by reference in its entirety. For the referenced ASTM standards, visit the ASTM website, www.astm.org, or contact ASTM Customer Service at service@astm.org.

ASTM D 1876 is entitled "Standard Test Method for Peel Resistance of Adhesives (T-Peel Test)." The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in its entirety. For the referenced ASTM standards, visit the ASTM website, www.astm.org, or contact ASTM Customer Service at service@astm.org.

The force required to separate the multi-layer structure apart in a T-peel configuration at 25.4 cm (10 inches)/min is measured using an INSTRON™ tensile tester. The average adhesion of five specimens is recorded as the peel strength in kg/cm (lb/in).

Incorporated Unsaturated Monomer (Weight Percent): The amount of the unsaturated monomer incorporated into the grafted polyolefin can be measured by wet chemical methods (titration, etc.) or Fourier transform infrared spectroscopy (FTIR).

"Molecular Weight Distribution (Mw/Mn)" is measured by gel permeation chromatography. MWD and the ratio $M_w/M_n$ are determined using a Waters 150-C ALC/Gel Permeation Chromatography (GPC) system equipped with a TSK column set (type GMHXL-HT) working at 135 degrees Celsius with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140 degrees Celsius for 1 hour. The solution is filtered through a 0.45 µm Teflon membrane. The filtrate (concentration 0.08-1.2 g/l injection volume 300 µl) is subjected to GPC. Monodisperse fractions of polystyrene (provided by Polymer Laboratories) are used as standard.

In a general embodiment, the present disclosure provides a polyolefin-based composition made from or containing
(A) a first grafted polyolefin composition,
(B) a second grafted polyolefin composition made from or containing a first metallocene-catalyzed linear low density polyethylene grafted with an unsaturated monomer,
(C) a second metallocene-catalyzed linear low density polyethylene composition,
(D) a Ziegler-Natta-catalyzed linear low density polyethylene composition,
(E) an elastomeric composition made from or containing
  (i) an elastomeric ethylene copolymer and
  (ii) an ethylene-propylene elastomer, and
(F) a tackifier composition.

In a general embodiment, the present disclosure provides a polyolefin-based composition made from or containing
(A) from about 5 to about 20 weight percent of a first grafted polyolefin composition made from or containing a polyolefin grafted with an unsaturated monomer, relative to the total weight of the polyolefin-based composition,
(B) from about 5 to about 15 weight percent of a second grafted polyolefin composition made from or containing a first metallocene-catalyzed linear low density polyethylene grafted with an unsaturated monomer, relative to the total weight of the polyolefin-based composition,
(C) from about 10 to about 30 weight percent of a second metallocene-catalyzed linear low density polyethylene composition made from or containing a second metallocene-catalyzed linear low density polyethylene, relative to the total weight of the polyolefin-based composition,
(D) from about 15 to about 35 weight percent of a Ziegler-Natta-catalyzed linear low density polyethylene composition made from or containing a Ziegler-Natta-catalyzed linear low density polyethylene, relative to the total weight of the polyolefin-based composition,
(E) an elastomeric composition made from or containing
  (i) from about 10 to about 20 weight percent of an elastomeric ethylene copolymer, relative to the total weight of the polyolefin-based composition, and
  (ii) from about 10 to about 20 weight percent of an ethylene-propylene elastomer, relative to the total weight of the polyolefin-based composition, and
(F) from about 2 to about 20 weight percent of a tackifier composition made from or containing a hydrocarbon-based tackifier, relative to the total weight of the polyolefin-based composition.

First Grafted Polyolefin Composition

In an embodiment, the first grafted polyolefin composition is present in an amount from about 5 to about 20 weight percent, relative to the total weight of the polyolefin-based composition. The first grafted polyolefin composition can be present in an amount from about 5 to about 15 weight percent. In some embodiments, the first grafted polyolefin is present in 5, 6, 7, 8, 9, 10, 11, 12, 13, 14, or 15 weight percent, relative to the total weight of the polyolefin-based composition.

Grafted polyolefins for use in making the first grafted polyolefin composition can be prepared by reacting high-density polyethylene (HDPE) with a first unsaturated monomer at elevated temperatures, with or without a free-radical initiator, under conditions effective to graft the first unsaturated monomer units onto the HDPE backbone. Preferably, the grafting reaction occurs under an inert gas, such as nitrogen.

In some embodiments, the HDPE has (a) a High Load Melt Index (HLMI) in the range of about 2 grams per 10 minutes to about 10 grams per 10 minutes and (b) density in the range of about 0.950 grams per cubic centimeter to about 0.967 grams per cubic centimeter.

In some embodiments, the first unsaturated monomer can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other unsaturated monomers are described in U.S. Pat. No. 6,385,777 and U.S. Patent Application Publication No. 2007/0054142, the teachings of which are incorporated herein by reference.

In some embodiments, the first grafted polyolefin is a HDPE grafted with maleic anhydride.

The relative amounts of HDPE and first unsaturated monomer used will vary and depend on factors such as the nature of the HDPE and the first unsaturated monomer, the desired tie-layer properties, the reaction conditions, the available equipment, and other factors. In some embodiments, the first unsaturated monomer is used in an amount within the range of about 0.1 to about 15 weight percent, based on the total weight of the first grafted polyolefin. In other embodiments, the first unsaturated monomer is used in an amount from about 0.5 to about 6 weight percent. In yet other embodiments, the first unsaturated monomer is used in an amount from about 1 to about 3 weight percent.

Grafting of the first unsaturated monomer(s) to the HDPE can be accomplished by heating a mixture of the first unsaturated monomer(s) and the HDPE. The grafted polyolefin can be prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed.

Grafting of the first unsaturated monomer to the HDPE is performed at elevated temperatures. Shear rates in the extruder can vary over a wide range.

The Second Grafted Polyolefin Composition

In some embodiments, the second grafted polyolefin composition is present in an amount from about 5 to about 15 weight percent, relative to the total weight of the polyolefin-based composition. In some embodiments, the second grafted polyolefin is present in 5, 6, 7, 8, 9, 10, 11, 12, 13, 14, or 15 weight percent, relative to the total weight of the polyolefin-based composition.

Grafted polyolefins for use in making the second grafted polyolefin composition can be prepared by reacting polyolefins with a second unsaturated monomer at elevated temperatures, with or without a free-radical initiator, under conditions effective to graft unsaturated monomer units onto the polyolefin backbone. Preferably, the grafting reaction occurs under an inert gas, such as nitrogen.

The polyolefins for making the grafted polyolefins of the second grafted polyolefin composition is a first metallocene-catalyzed linear low density polyethylene. In some embodiments, the second unsaturated monomer can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof.

In some embodiments, the polyolefin grafted with a second unsaturated monomer is a first metallocene-catalyzed linear low density polyethylene grafted with maleic anhydride. In some embodiments, the grafted metallocene-catalyzed linear low density polyethylene has a melt index from about 0.5 to about 20 grams per 10 minutes, a density from about 0.840 to about 0.920 grams per cubic centimeter, and the second unsaturated monomer in an amount within the range of about 0.2 to about 1.0 weight percent, based on the total weight of the grafted polyolefin.

Such grafted polyolefins are commercially available as TAFMER™ (Mitsui Chemical) polymers.

Second Metallocene-catalyzed Linear Low Density Polyethylene Composition

In an embodiment, the second metallocene-catalyzed linear low density polyethylene composition is present in an amount from about 10 to about 30 weight percent, relative to the total weight of the polyolefin-based composition. In some embodiments, the second metallocene-catalyzed linear low density polyethylene composition is present in an amount from about 15 to about 25 weight percent, relative to the total weight of the polyolefin-based composition. In some embodiments, the second metallocene-catalyzed linear low density polyethylene composition is present in 15, 16, 17, 18, 19, 20, 21, 22, 23, 24, or 25 weight percent, relative to the total weight of the polyolefin-based composition.

The second metallocene-catalyzed linear low density polyethylene composition for use in the present invention is made from or contains a second metallocene-catalyzed linear low density polyethylene having a melt index from about 0.5 to about 10 grams per 10 minutes. In some embodiments, the second metallocene-catalyzed linear low density polyethylene has a density from about 0.900 to about 0.925 grams per cubic centimeter. In some embodiments, the second metallocene-catalyzed linear low density polyethylene has a polydispersity index from about 2 to about 4.

Ziegler-Natta-Catalyzed Linear Low Density Polyethylene Composition

In an embodiment, the Ziegler-Natta-catalyzed linear low density polyethylene composition is present in an amount from about 15 to about 35 weight percent, relative to the total weight of the polyolefin-based composition. In some embodiments, the Ziegler-Natta-catalyzed linear low density polyethylene composition is present in an amount from about 20 to about 30 weight percent, relative to the total weight of the polyolefin-based composition. In some embodiments, the Ziegler-Natta-catalyzed linear low density polyethylene composition is present in 20, 21, 22, 23, 24, 25, 26, 27, 28, 29, or 30 weight percent, relative to the total weight of the polyolefin-based composition.

The Ziegler-Natta-catalyzed linear low density polyethylene composition for use in the present invention is made from or contains a Ziegler-Natta-catalyzed linear low density polyethylene having a melt index from about 0.5 to about 5 grams per 10 minutes. In some embodiments, the Ziegler-Natta-catalyzed linear low density polyethylene has a density from about 0.910 to about 0.930 grams per cubic centimeter.

Elastomeric Composition

The elastomeric composition is made from or contains (i) an elastomeric ethylene copolymer and (ii) an ethylene-propylene elastomer.

In an embodiment, the elastomeric ethylene copolymer is present in an amount from about 10 to about 20 weight percent, relative to the total weight of the polyolefin-based composition. In some embodiments, the elastomeric ethylene copolymer is present in 10, 11, 12, 13, 14, 15, 16, 17, 18, 19, or 20 weight percent, relative to the total weight of the polyolefin-based composition.

Examples of elastomeric ethylene copolymers include ethylene/alpha-olefin copolymers with at least one $C_3$ to $C_{10}$ alpha-olefin comonomer, and optionally, a polyene comonomer. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. In some embodiments, the elastomeric ethylene copolymer is an ethylene/alpha-olefin copolymers with (a) ethylene-derived units and (b) alpha-olefin comonomer units derived from at least one comonomer selected from the group consisting of $C_3$ to $C_{10}$ alpha-olefins. In other embodiments, the elastomeric ethylene copolymer is an ethylene/octene copolymer. In yet other embodiments, the ethylene/octene copolymer has a melt index from about 0.1 to about 10.0 grams per 10 minutes and a density from about 0.820 to about 0.920 grams per cubic centimeter.

Exemplary elastomeric ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene, and ethylene/1,3,5-hexatriene. Exemplary elastomeric ethylene terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene, and ethylene/propylene/1,3,5-hexatriene. Exemplary elastomeric ethylene tetrapolymers include ethylene/propylene/1-octene/diene, ethylene/butene/1-octene/diene, and ethylene/propylene/mixed dienes.

Such elastomeric ethylene copolymers are commercially available as ENGAGE™ (The Dow Chemical Company), EXACT™ (ExxonMobil Chemical Company), or TAFMER™ (Mitsui Chemical) polymers.

In an embodiment, the ethylene-propylene elastomer is present in an amount from about 10 to about 20 weight percent, relative to the total weight of the polyolefin-based composition. In some embodiments, the ethylene-propylene elastomer is present in 10, 11, 12, 13, 14, 15, 16, 17, 18, 19, or 20 weight percent, relative to the total weight of the polyolefin-based composition.

Examples of ethylene-propylene elastomers include ethylene-propylene rubber (EPR), ethylene-propylene-diene monomer rubber (EPDM), the like, and mixtures thereof. In some embodiments, the ethylene-propylene elastomers contain from about 10 to about 80 weight percent of ethylene recurring units, based upon the total weight of the olefin elastomer. In other embodiments, the ethylene-propylene elastomers contain from about 10 to about 70 weight percent of ethylene units. In some other embodiments, the ethylene-propylene elastomer is an ethylene-propylene rubber (EPR) having (a) a melt index from about 0.2 to about 20.0 grams per 10 minutes and (b) a total content of ethylene-derived units in an amount from about 55 to about 85 weight percent, based upon the total weight of the ethylene propylene rubber.

Commercially available ethylene-propylene elastomers include Lanxess Corporation's BUNA™ EP T2070 (68 weight percent ethylene and 32 weight percent propylene, based on the total weight of the copolymer); BUNA™ EP T2370 (3 weight percent ethylidene norbornene, 72 weight percent ethylene, and 25 weight percent propylene, based on the total weight of the copolymer); BUNA™ EP T2460 (4 weight percent ethylidene norbornene, 62 weight percent ethylene, and 34 weight percent propylene, based on the total weight of the copolymer); ExxonMobil Chemical's VISTALON™ 707 (72 weight percent ethylene and 28 weight percent propylene, based on the total weight of the copolymer); VISTALON™ 722 (72 weight percent ethylene and 28 weight percent propylene, based on the total weight of the copolymer); and VISTALON™ 828 (60 weight percent ethylene and 40 weight percent propylene, based on the total weight of the copolymer).

Suitable ethylene-propylene elastomers also include ExxonMobil Chemical's VISTAMAXX™ elastomers, particularly grades 6100, 1100, and 3000, and The Dow Chemical Company's VERSIFY™ elastomers, particularly grades DP3200.01, DP3300.01, and DP3400.01, which have ethylene contents of 9 weight percent, 12 weight percent, and 15 weight percent, respectively, based upon the total weight of the copolymer.

Additional EPDM rubbers include Dow's NORDEL™ hydrocarbon rubber, e.g., the 3722P, 4760P, and 4770R grades.

Tackifier Composition

In some embodiments, the tackifier composition is present in an amount from about 2 to about 20 weight percent, relative to the total weight of the polyolefin-based composition. In other embodiments, the tackifier composition is in an amount from about 2 to about 10 weight percent.

The tackifier composition is made from or contains a hydrocarbon-based tackifier. Examples of hydrocarbon-based tackifiers include aliphatic, cycloaliphatic, and aromatic hydrocarbons, modified hydrocarbons, hydrogenated versions, and mixtures of two or more of these tackifiers. These tackifying resins have a ring and ball softening point from 70 degrees Celsius to 150 degrees Celsius.

Examples include EASTOTAC™ H-100, H-115 and H-130 (Eastman Chemical Co.), which are partially hydrogenated cycloaliphatic petroleum hydrocarbon resins with softening points of 100 degrees Celsius, 115 degrees Celsius, and 130 degrees Celsius, respectively. These are available in the E grade, the R grade, the L grade and the W grade, indicating differing levels of hydrogenation.

Other tackifying resins include ESCOREZ™ 5300, 5320, 5340, 5380, 5400, and 5637, partially hydrogenated aliphatic petroleum hydrocarbon resins, and ESCOREZ™ 5600, 5620, and 5690, partially hydrogenated aromatic modified petroleum hydrocarbon resins all available from ExxonMobil Chemical; WINGTACK™ Extra, which is an aliphatic, aromatic petroleum hydrocarbon resin (Goodyear Chemical); HERCOLITE™ 2100, a partially hydrogenated cycloaliphatic petroleum hydrocarbon resin (Hercules).; NORSOLENE™ hydrocarbon resins (Cray Valley); and ARKON™ water white, hydrogenated hydrocarbon resins (Arakawa Europe).

In some embodiments, the hydrocarbon-based tackifier is a cyclic-hydrocarbon-based tackifier.

The polyolefin-based composition can include other components as additives. Examples include adhesion promoters, elastomeric polymers, UV inhibitors, antioxidants, thermal stabilizers, and the like.

In another general embodiment, the present disclosure provides an adhesive made from or containing
  (A) from about 5 to about 20 weight percent of a first grafted polyolefin composition made from or containing a high-density polyethylene (HDPE) grafted with a first unsaturated monomer, relative to the total weight of the polyolefin-based composition,
  (B) from about 5 to about 15 weight percent of a second grafted polyolefin composition made from or containing a first metallocene-catalyzed linear low density polyethylene grafted with a second unsaturated monomer, relative to the total weight of the polyolefin-based composition,
  (C) from about 10 to about 30 weight percent of a second metallocene-catalyzed linear low density polyethylene composition made from or containing a second metallocene-catalyzed linear low density polyethylene, relative to the total weight of the polyolefin-based composition,
  (D) from about 15 to about 35 weight percent of a Ziegler-Natta-catalyzed linear low density polyethylene composition made from or containing a Ziegler-Natta-catalyzed linear low density polyethylene, relative to the total weight of the polyolefin-based composition,
  (E) an elastomeric composition made from or containing
    (i) from about 10 to about 20 weight percent of an elastomeric ethylene copolymer, relative to the total weight of the polyolefin-based composition; and
    (ii) from about 10 to about 20 weight percent of an ethylene-propylene elastomer, relative to the total weight of the polyolefin-based composition; and (F) from about 2 to about 20 weight percent of a tackifier composition made from or containing a hydrocarbon-based tackifier, relative to the total weight of the polyolefin-based composition.

The adhesive composition can take any form, e.g., hot-melt, pressure sensitive, solvent-based, etc.

Tie-Layer Structure

The adhesives are useful as a tie-layer for making multi-layer structures such as films and sheets, including barrier films. A film can have a thickness of less than about 10 mils while a sheet has a thickness of as least about 10 mils. The multi-layer structures have at least two layers in addition to the adhesive layer, which bonds the other layers together. In some embodiments, at least one layer serves as a barrier layer.

Tie-layer adhesives of the present disclosure can be used in numerous multi-layer structures, including structures having from 2 to 11 polymer-based layers.

In another general embodiment, the present disclosure provides a multi-layered structure made from or containing
(A) a tie-layer adhesive, and
(B) a polymer layer.

Multi-layer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically polar polymers such as ethylene-vinyl alcohol (EVOH) or polyamide resins such as nylon. Other layers may be made from or contain a polyester.

Tie-layer adhesives of the present disclosure can be used in numerous multi-layer barrier film constructions. Generic illustrative multi-layer constructions include the following:
PE/tie-layer/barrier/tie-layer/PP/tie-layer/PE
PE/tie-layer/barrier/tie-layer/PE/tie-layer/PP
PP/tie-layer/barrier/tie-layer/PE/tie-layer/PP
PE/tie-layer/barrier/tie-layer/PE/tie-layer/PE
PP/tie-layer/barrier/tie-layer/PP/tie-layer/PP
PE/tie-layer/barrier/tie-layer/PE
PE/tie-layer/barrier/tie-layer/PP
PP/tie-layer/barrier/tie-layer/PP
PET/tie-layer/barrier/tie-layer/PP/tie-layer/PET
PET/tie-layer/barrier/tie-layer/PET/tie-layer/PP
PP/tie-layer/barrier/tie-layer/PET/tie-layer/PP
PET/tie-layer/barrier/tie-layer/PET/tie-layer/PET
PP/tie-layer/barrier/tie-layer/PP/tie-layer/PP
PET/tie-layer/barrier/tie-layer/PET
PET/tie-layer/barrier/tie-layer/PP
PP/tie-layer/barrier/tie-layer/PP More specific examples, where "FCL" represents a food contact layer, include:
HDPE/tie-layer/EVOH/tie-layer/HDPE
HDPE/tie-layer/polyamide/tie-layer/HDPE
EVOH/tie-layer/HDPE/tie-layer/EVOH
LDPE/tie-layer/polyamide/tie-layer/FCL
LDPE/tie-layer/EVOH/tie-layer/FCL
LLDPE/tie-layer/EVOH/tie-layer/FCL
LLDPE/tie-layer/polyamide/tie-layer/FCL
HDPE/tie-layer/EVOH/tie-layer/FCL
HDPE/tie-layer/polyamide/tie-layer/FCL
HDPE/tie-layer/polyamide/EVOH/polyamide/tie-layer/FCL In some embodiments, the tie-layer adhesive is adjacent to a layer of polyester. In other embodiments, the tie-layer adhesive binds the layer of polyester to a dissimilar substrate. In some other embodiments, the polyester is a polyethylene terephthalate or a copolyester.

In some embodiments, the multi-layered structure can have three layers, having a first polymer layer, a tie-layer, and a second polymer layer. The first polymer layer can have a thickness is the range of about 20 to about 50 percent, based upon the total thickness of the structure. The tie-layer can have a thickness in the range of about 3 to about 12 percent, based upon the total thickness of the structure. The second polymer layer can have a thickness is the range of about 20 to about 50 percent, based upon the total thickness of the structure.

In some embodiments, the multi-layered structure can have five layers, having a first polymer layer, a first tie-layer, a second polymer layer, a second tie-layer, and a third polymer layer. The first polymer layer can have a thickness is the range of about 20 to about 50 percent, based upon the total thickness of the structure. The first tie-layer can have a thickness in the range of about 3 to about 12 percent, based upon the total thickness of the structure. The second polymer layer can have a thickness is the range of about 3 to about 15 percent, based upon the total thickness of the structure. The second tie-layer can have a thickness in the range of about 3 to about 12 percent, based upon the total thickness of the structure. The third polymer layer can have a thickness is the range of about 20 to about 50 percent, based upon the total thickness of the structure.

Examples

The following examples are included to demonstrate embodiments of the invention. It should be appreciated by those of skill in the art that the techniques disclosed in the examples which follow represent techniques discovered by the inventor to function well in the practice of the invention, and thus can be considered to constitute exemplary modes for its practice. However, those of skill in the art should, in light of the present disclosure, appreciate that many changes can be made in the specific embodiments which are disclosed and still obtain a like or similar result without departing from the spirit and scope of the invention.

For the comparative examples and the examples of an embodiment of the present invention, various compounds were formulated to prepare test specimen. The materials were admixed in the weight percents shown in Table 1.

Grafted Polyolefins: The first grafted polyolefin was the reaction product of a high density polyethylene and maleic anhydride, having a melt index of 7 grams per 10 minutes and a maleic anhydride content of 1.7 weight percent, based upon the total weight of the grafted polyolefin. (Before grafting, the HDPE had a high load melt index of 5.0 grams per 10 minutes and a density of 0.956 grams per cubic centimeter.) The second grafted polyolefin was Mitsui's TAFMER™ 8510 maleic anhydride-grafted metallocene linear low density polyethylene (Melt Index: 3.5 grams per 10 minutes; Density of 0.885 grams per cubic centimeter; and maleic anhydride content of 0.4 weight percent, based upon the total weight of the grafted polyolefin).

Linear Low Density Polyethylenes: Equistar Chemical's STARFLEX™ GM1210BAX01 metallocene linear low density polyethylene (Melt Index: 1.0 grams per 10 minutes; Density of 0.912 grams per cubic centimeter; Polydispersity Index: 2.74; $M_n$: 43,600; $M_w$: 119,300; $M_z$: 226,300; and $M_{z+1}$: 366,800); Equistar Chemical's STARFLEX™ GM1835CAX01 metallocene linear low density polyethylene (Melt Index: 3.5 grams per 10 minutes; Density of 0.918 grams per cubic centimeter; Polydispersity Index: 2.58; $M_n$:

32,800; $M_w$: 84,700; $M_z$: 160,400; and $M_{z+1}$: 263,000); and GA502019 Ziegler-Natta-catalyzed linear low density polyethylene (Melt Index: 2.0 grams per 10 minutes; Density of 0.920 grams per cubic centimeter).

Long-Chain Branched Polyolefin: Equistar Chemical's PETROTHENE™ NA940000 extrusion grade low density polyethylene (Melt Index: 0.25 grams per 10 minutes; Density: 0.918 grams per cubic centimeter).

Elastomers: Dow Chemical Company's ENGAGE™ 8180 ethylene/octene copolymer (Melt Index: 0.50 grams per 10 minutes; Density of 0.863 grams per cubic centimeter); ExxonMobil's VISTALON™ 722 ethylene propylene rubber, having 72 weight percent ethylene recurring units, based upon the total weight of the EPR (Melt Index of 1.0 grams per 10 minutes).

Tackifier: Eastman Chemical Company's EASTOTAC™ H-115W hydrogenated hydrocarbon resin (Ring and Ball Softening Point of 115 degrees Celsius; Density: 1.04 grams per cubic centimeter)

Additives: B225 which is a 1:1 blend of IRGANOX™ 1010 sterically-hindered phenolic antioxidant and IRGAFOS™ 168 trisarylphosphite processing stabilizer.

Film/Sheet Resins:
GA502019 Ziegler-Natta-catalyzed linear low density polyethylene (Melt Index: 2.0 grams per 10 minutes; Density of 0.920 grams per cubic centimeter);
Soarus SOARNOL™ DC3203F ethylene vinyl alcohol (EVOH) copolymer (Ethylene Content: 32 mole percent; Melt Flow Rate: 3.2 grams per 10 minutes; Density of 1.19 grams per cubic centimeter); and
DAK Americas 9921 polyethylene terephthalate.

Compounding Conditions

All components were dry blended. Then, the formulated materials were melt compounded with Lestritz L-18 twin-screw extruder equipped with a multi-hole (⅛ inch diameter) die connected to a strand cutter. The extruder screw speed was 200 RPM. The temperature condition was 200 degrees Celsius in the metering zone and 210 degrees Celsius at the die.

Film/Sheet Preparation

To evaluate clarity, 5-mil five-layer coextruded films were prepared. To evaluate adhesion of the tie-layer composition, 40-mil five-layer coextruded sheets were prepared. All multilayer structures had an A/B/C/B/A layer structure, where A represents the outer layer, B represents the tie-layer, and C represents the barrier layer.

For the clarity specimen, the outer layer was prepared with the GA502019 Ziegler-Natta-catalyzed linear low density polyethylene (LLDPE) and the barrier layer was prepared with Soarus SOARNOL™ DC3203F ethylene vinyl alcohol (EVOH) copolymer. The layer distribution was 41 thickness percent, 5 thickness percent, 8 thickness percent, 5 thickness percent, and 41 thickness percent, respectively based on total structure thickness.

For the adhesion specimen, the outer layer was a polyethylene terephtalate (PET) for the adhesion evaluations and the barrier layer was the GA502019 Ziegler-Natta-catalyzed linear low density polyethylene (LLDPE). The layer distribution was 35 thickness percent, 10 thickness percent, 10 thickness percent, 10 thickness percent, and 35 thickness percent, respectively based on total structure thickness. The 20-mil structures were prepared by draw-down of the 40-mil structures.

The structures were produced on a Killion extruder (in this case, three extruders) with a barrel length to barrel diameter (L/D) ratio of 24:1, a barrel diameter of about 2.54 cm (1 inch) to about 3.18 cm (1.25 inches), 3 barrel heating zones, and a 10 inch flat die to produce continuous 8 inch specimen. Killion extruders may be obtained from Killion Extruders, Inc. of Cedar Grove, N.J.

For the clarity specimen, temperatures in the three heating zones and at the die for each of the three extruders used were as follow:
LLDPE: 182° C. (360° F.)/199° C. (390° F.)/204° C. (400° F.)/210° C. (410° F.);
EVOH: 193° C. (380° F.)/193° C. (380° F.)/199° C. (390° F.)/210° C. (410° F.);
Tie-layer: 177° C. (350° F.)/193° C. (380° F.)/204° C. (400° F.)/224° C. (435° F.).

For the adhesion specimen, temperatures in the three heating zones and at the die for each of the three extruders used were as follow:
PET: 274° C. (525° F.)/282° C. (540° F.)/271° C. (520° F.)/274° C. (526° F.);
LLDPE: 193° C. (380° F.)/193° C. (380° F.)/199° C. (390° F.)/210° C. (410° F.);
Tie-layer: 177° C. (350° F.)/193° C. (380° F.)/204° C. (400° F.)/224° C. (435° F.).

TABLE 1

| Component/Test | Comp. Ex. 1 | Example 2 |
|---|---|---|
| First Grafted Polyolefin | 12 | 10 |
| TAFMER 8510 | | 10 |
| GM1210BAX01 | 21 | 21 |
| GM1835CAX01 | 21.85 | |
| GA502019 | | 23.85 |
| NA940000 | 10 | |
| ENGAGE ™ 8180 | 15 | 15 |
| VISTALON ™ 722 | 15 | 15 |
| EASTOTAC ™ H-115W | 5 | 5 |
| Additive: B225 | 0.15 | 0.15 |
| Total | 100 | 100 |
| 20-Mil (w/PET Outer Layer) (Test by ASTM D 1876): | | |
| Adhesion (7 Day @ 274 degrees Celsius) kg/cm (lb/in) | 0.304 (1.7) | 0.322 (1.8) |
| Adhesion (11 Day @ 274 degrees Celsius) kg/cm (lb/in) | 0.376 (2.1) | 0.465 (2.6) |
| 40-Mil (w/PET Outer Layer) (Test by ASTM D 1876): | | |
| Adhesion (7 Days @ 274 degrees Celsius) kg/cm (lb/in) | 0.268 (1.5) | 0.716 (4) |
| Adhesion (11 Days @ 274 degrees Celsius) kg/cm (lb/in) | 0.501 (2.8) | 0.948 (5.3) |
| 20-Mil (w/PET Outer Layer) (Test by ASTM D 1876): | | |
| Adhesion (7 Day @ 280 degrees Celsius) kg/cm (lb/in) | 0.519 (2.9) | 0.752 (4.2) |
| Adhesion (11 Day @ 280 degrees Celsius) kg/cm (lb/in) | 0.447 (2.5) | 0.770 (4.3) |
| 40-Mil (w/PET Outer Layer) (Test by ASTM D 1876): | | |
| Adhesion (7 Days @ 280 degrees Celsius) kg/cm (lb/in) | 0.250 (1.4) | 0.501 (2.8) |
| Adhesion (11 Days @ 280 degrees Celsius) kg/cm (lb/in) | 0.250 (1.4) | 0.626 (3.5) |
| 5-Mil (w/LLDPE Outer Layer) (Test by ASTM D 1746): Percent NAS | 23 | 29 |

* All weight percentages are based upon the total weight of the final composition.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polyolefin composition comprising:
   (A) a first grafted polyolefin composition comprising a high-density polyethylene (HDPE) grafted with a first unsaturated monomer;
   (B) a second grafted polyolefin composition comprising a first metallocene-catalyzed linear low density polyethylene grafted with a second unsaturated monomer;
   (C) a second metallocene-catalyzed linear low density polyethylene composition comprising a second metallocene-catalyzed linear low density polyethylene;
   (D) a Ziegler-Natta-catalyzed linear low density polyethylene composition comprising a Ziegler-Natta-catalyzed linear low density polyethylene;
   (E) an elastomeric composition comprising:
      (i) an elastomeric ethylene copolymer; and
      (ii) an ethylene-propylene elastomer; and
   (F) a tackifier composition comprising a hydrocarbon-based tackifier.

2. The polyolefin composition of claim 1, wherein
   (A) the HDPE has:
      (i) a High Load Melt Index (HLMI) from about 2 grams per 10 minutes to about 10 grams per 10 minutes; and
      (ii) a density from about 0.950 grams per cubic centimeter to about 0.967 grams per cubic centimeter; and
   (B) the first unsaturated monomer is: maleic anhydride.

3. The polyolefin-based composition of claim 1, wherein the first metallocene-catalyzed linear low density polyethylene grafted with the second unsaturated monomer has:
   (A) a melt index from about 0.5 to about 20 grams per 10 minutes; and
   (B) a density from about 0.840 to about 0.920 grams per cubic centimeter.

4. The polyolefin composition of claim 1, wherein the second metallocene-catalyzed linear low density polyethylene has:
   (A) a melt index from about 0.5 to about 10 grams per 10 minutes;
   (B) a density from about 0.900 to about 0.925 grams per cubic centimeter; and
   (C) a polydispersity index from about 2 to about 4.

5. The polyolefin composition of claim 1, wherein the Ziegler-Natta-catalyzed linear low density polyethylene has:
   (A) a melt index from about 0.5 to about 5 grams per 10 minutes; and
   (B) a density from about 0.910 to about 0.930 grams per cubic centimeter.

6. The polyolefin composition of claim 1, wherein the elastomeric ethylene copolymer comprises:
   (A) ethylene-derived units; and
   (B) alpha-olefin comonomer units derived from at least one comonomer selected from the group consisting of $C_3$ to $C_{10}$ alpha-olefins.

7. The polyolefin composition of claim 6, wherein the elastomeric ethylene copolymer is an ethylene/octene copolymer having
   (A) a melt index from about 0.1 to about 10.0 grams per 10 minutes; and
   (B) a density from about 0.820 to about 0.920 grams per cubic centimeter.

8. The polyolefin composition of claim 1, wherein the ethylene-propylene elastomer is selected from the group consisting of:
   (A) an ethylene-propylene rubber (EPR); and
   (B) an ethylene-propylene-diene monomer rubber (EPDM).

9. The polyolefin composition of claim 8, wherein the ethylene-propylene elastomer is an ethylene-propylene rubber (EPR) having
   (A) a melt index from about 0.2 to about 20.0 grams per 10 minutes; and
   (B) a total content of ethylene-derived units in an amount from about 55 to about 85 weight percent, based upon the total weight of the ethylene propylene rubber.

10. The polyolefin composition of claim 1, wherein the hydrocarbon-based tackifier is a cyclic-hydrocarbon-based tackifier.

11. The polyolefin composition of claim 1, comprising:
   (A) from about 5 to about 20 weight percent of a first grafted polyolefin composition comprising a polyolefin grafted with a first unsaturated monomer, relative to the total weight of the polyolefin-based composition;
   (B) from about 5 to about 15 weight percent of a second grafted polyolefin composition comprising a first metallocene-catalyzed linear low density polyethylene grafted with a second unsaturated monomer, relative to the total weight of the polyolefin-based composition;
   (C) from about 10 to about 30 weight percent of a metallocene-catalyzed linear low density polyethylene composition comprising a metallocene-catalyzed linear low density polyethylene, relative to the total weight of the polyolefin-based composition;
   (D) from about 15 to about 35 weight percent of a Ziegler-Natta-catalyzed linear low density polyethylene composition comprising a Ziegler-Natta-catalyzed linear low density polyethylene, relative to the total weight of the polyolefin-based composition;
   (E) an elastomeric composition comprising:
      (i) from about 10 to about 20 weight percent of an elastomeric ethylene copolymer, relative to the total weight of the polyolefin-based composition; and
      (ii) from about 10 to about 20 weight percent of an ethylene-propylene elastomer, relative to the total weight of the polyolefin-based composition; and
   (F) from about 2 to about 20 weight percent of a tackifier composition comprising a hydrocarbon-based tackifier, relative to the total weight of the polyolefin-based composition.

12. An adhesive comprising:
   (A) from about 5 to about 20 weight percent of a first grafted polyolefin composition comprising a polyolefin grafted with a first unsaturated monomer, relative to the total weight of the polyolefin-based composition;
   (B) from about 5 to about 15 weight percent of a second grafted polyolefin composition comprising a first metallocene-catalyzed linear low density polyethylene grafted with a second unsaturated monomer, relative to the total weight of the polyolefin-based composition;
(C) from about 10 to about 30 weight percent of a metallocene-catalyzed linear low density polyethylene composition comprising a metallocene-catalyzed linear low density polyethylene, relative to the total weight of the polyolefin-based composition;
(D) from about 15 to about 35 weight percent of a Ziegler-Natta-catalyzed linear low density polyethylene composition comprising a Ziegler-Natta-catalyzed linear low density polyethylene, relative to the total weight of the polyolefin-based composition;
(E) an elastomeric composition comprising:
  (i) from about 10 to about 20 weight percent of an elastomeric ethylene copolymer, relative to the total weight of the polyolefin-based composition; and
  (ii) from about 10 to about 20 weight percent of an ethylene-propylene elastomer, relative to the total weight of the polyolefin-based composition; and
(F) from about 2 to about 20 weight percent of a tackifier composition comprising a hydrocarbon-based tackifier, relative to the total weight of the polyolefin-based composition.

13. A multi-layered structure comprising:
(A) a tie-layer adhesive comprising:
  (i) from about 5 to about 20 weight percent of a first grafted polyolefin composition comprising a polyolefin grafted with a first unsaturated monomer, relative to the total weight of the polyolefin-based composition;
  (ii) from about 5 to about 15 weight percent of a second grafted polyolefin composition comprising a first metallocene-catalyzed linear low density polyethylene grafted with a second unsaturated monomer, relative to the total weight of the polyolefin-based composition;
  (iii) from about 10 to about 30 weight percent of a metallocene-catalyzed linear low density polyethylene composition comprising a metallocene-catalyzed linear low density polyethylene, relative to the total weight of the polyolefin-based composition;
  (iv) from about 15 to about 35 weight percent of a Ziegler-Natta-catalyzed linear low density polyethylene composition comprising a Ziegler-Natta-catalyzed linear low density polyethylene, relative to the total weight of the polyolefin-based composition;
  (v) an elastomeric composition comprising:
    (a) from about 10 to about 20 weight percent of an elastomeric ethylene copolymer, relative to the total weight of the polyolefin-based composition; and
    (b) from about 10 to about 20 weight percent of an ethylene-propylene elastomer, relative to the total weight of the polyolefin-based composition; and
  (vi) from about 2 to about 20 weight percent of a tackifier composition comprising a hydrocarbon-based tackifier, relative to the total weight of the polyolefin-based composition; and
(B) a polymer layer.

14. The multi-layered structure of claim 13, comprising a polyester layer.

15. The multi-layer structure of claim 14, wherein the polyester is a polyethylene terephthalate.

16. The multi-layer structure of claim 14, wherein the polyester is a copolyester.

* * * * *